United States Patent Office 3,756,903
Patented Sept. 4, 1973

3,756,903
CLOSED-LOOP SYSTEM FOR MAINTAINING CONSTANT TEMPERATURE
Elmer R. Jones, Reading, Mass., assignor to Wakefield Engineering, Inc., Wakefield, Mass.
Filed June 15, 1971, Ser. No. 153,296
Int. Cl. B60h 1/00
U.S. Cl. 161—39    16 Claims

ABSTRACT OF THE DISCLOSURE

The fluid-filled closed loop system maintains a temperature stable platform, having dynamically operated electronic devices such as power transistors secured thereto, at a constant predetermined temperature. In addition to the platform, the system comprises a heater positioned below the platform and a reservoir and associated heat exchanger positioned above the platform. A continuous multi-section conduit circuit couples the output of the heater to the reservoir and thence to an input of the heat exchanger, and is in thermal contact with a surface of the temperature stable platform. Vapor bubbles formed in the heater rise in the conduit circuit section contacting the platform, are released from the surface of the liquid in the reservoir, and are condensed by the continuously operated heat exchanger.

Figure 1:
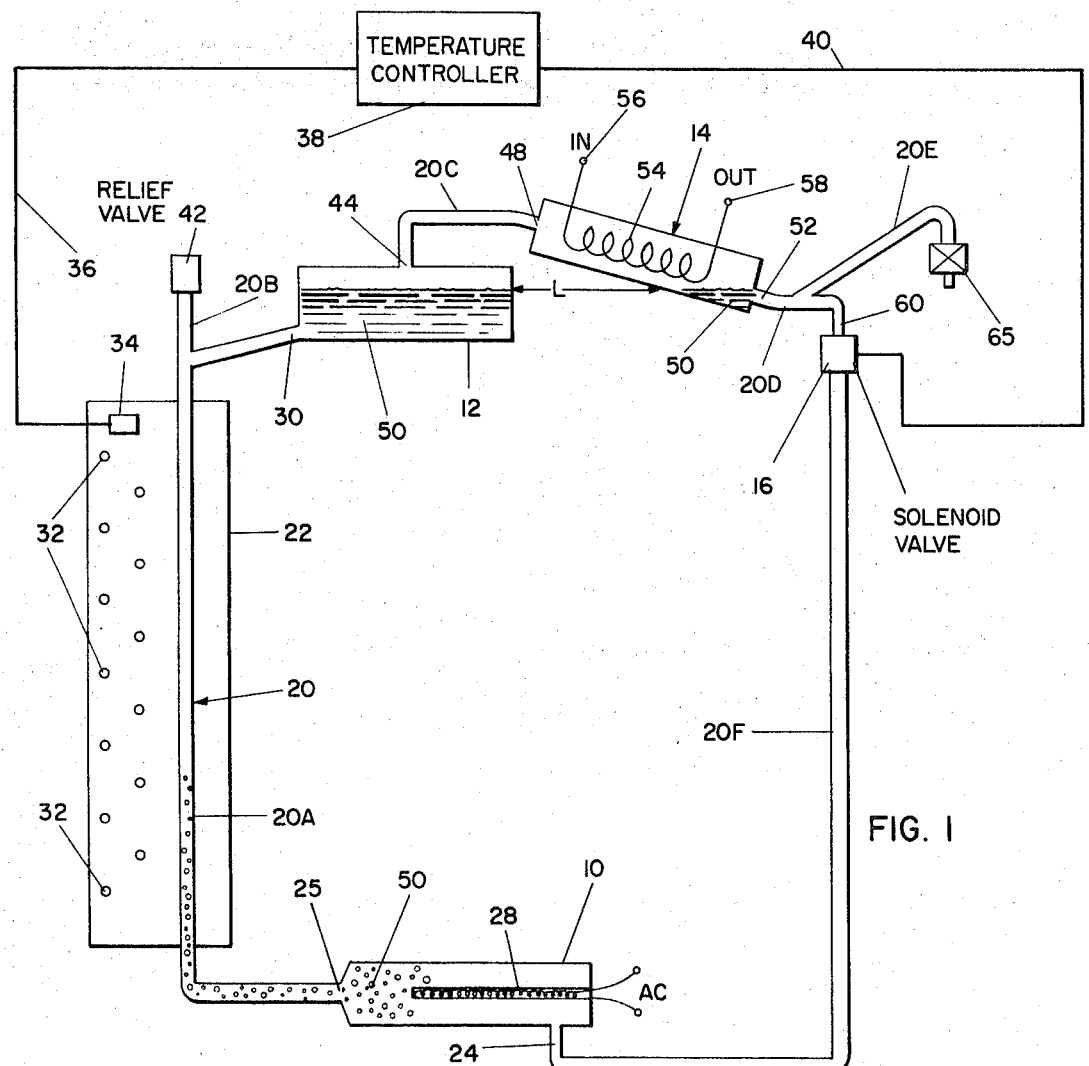

The system also comprises a temperature controlled solenoid valve at the output of the heat exchanger, and a return conduit section coupled from the valve to an input of the heater. The valve which is responsive to the temperature of the platform, opens when the temperature exceeds a predetermined value thereby providing cooled liquid for the heater which in turn lowers the temperature of the liquid in the fluid conduit and platform. When a small temperature decrease occurs, the valve closes and the temperature of the platform increases. This cyclic operation continues and the temperature of the platform is controllable to within fractions of a centigrade degree.

FIELD OF THE INVENTION

The present invention relates in general to a system for maintaining a temperature stable member at a constant predetermined temperature. The system comprises a heater for supplying heat to the member, a heat exchanger, and means for periodically delivering cooled liquid to the heater to stabilize the temperature of the member. More particularly, the present invention is concerned with a fluid-filled closed-loop system adapted to maintain a temperature stable member, having heat dissipating electronic devices such as power transistors fastened thereto, at a constant predetermined temperature regardless of changes in the dissipation of the devices.

BACKGROUND OF THE INVENTION

One known system, used to control the operating temperature of electronic devices being dynamically tested, is a closed loop system wherein all the components comprising the system are operated at elevated temperatures. This system generally comprises a temperature stable platform or the like to which the electronic devices are secured, a continuous conduit circuit thermally contacting the platform, a heat exchanger and a heater for causing heating of the fluid in the conduit. The heat exchanger may include a cooling coil or the like having no liquid coolant passing therethrough as the heater is causing heating of the platform toward some desired operating temperature. When the desired temperature is attained a coolant is metered into the cooling coil of the heat exchanger at a predetermined rate to cause the temperature of the liquid fed to the heater to fall thereby stabilizing the temperature of the platform.

One of the drawbacks associated with this known system is that all of the components including the heat exchanger are "hot," and operate at substantially the same temperature as the temperature stable platform. The system thus is less efficient due to additional heat losses. Probably more important, however, is the difficulty in providing the necessary cooling at the heat exchanger when the desired temperature is reached. If the desired operating temperature is 150° C., for example, and the coolant to be introduced into the coil of the heat exchanger is cold tap water, this cold tap water must be metered into the coil at a slow enough rate and also at high pressures in order to allow the coil temperature to reach the operating temperature, otherwise the vapor will condense at a rate as fast as vaporization thus not allowing for regulation of the temperature. In the example previously cited where the operating temperature is 150° C., the pressure with which the water is forced through the coil would have to be on the order of 80 p.s.i. to prevent boiling of the water in the coil. Thus, ordinary tap water at lower pressures could not be used. Expensive equipment would have to be provided to increase the pressure. This also adds to the cost of this type of system.

Another type of prior art system is a pressurized, closed-loop, completely liquid-filled system. This system also includes a continuous conduit circuit, a heater, platform and a liquid-to-liquid heat exchanger. A pump is provided to circulate the liquid through the system while the heat exchanger is periodically responsive to the platform temperature to cause a cooling of the liquid from the heat exchanger which in turn stabilizes the temperature of the liquid in the system.

OBJECTIVES OF THE INVENTION

One objective of the present invention is to provide a closed-loop, vacuum sealed, fluid-filled heat transfer system without the need of a mechanical rotating pump.

Another objective of this invention is to provide an improved closed-loop heat transfer system for maintaining a temperature stable member, such as a flat metal platform preferably for retaining electronic devices, at a constant predetermined temperature.

Still another objective of this invention is to provide a system in accordance with the preceding objective that provides good thermal conductivity between the fluid conduit and the temperature stable member in those areas where the conduit and member are in thermal contact.

A further objective of this invention is to provide a system in accordance with the preceding objective that is readily completely sealable. With a sealed system a vacuum can be pulled on the system thereby providing for low pressure operation. The boiling point of the fluid in the system is low and thus low temperature operation is readily possible.

SUMMARY OF THE INVENTION

In accordance with the present invention, a fluid-filled closed-loop heat transfer system maintains a temperature stable member, having electronic devices thermally attached thereto, at a constant predetermined temperature. The system generally comprises a heat source positioned below the temperature stable member and a reservoir and associated heat exchanger positioned above the member. A continuous single or multi-section conduit circuit couples the output of the heater to the reservoir and thence to an input of the heat exchanger and is in thermal contact with a surface of the temperature stable member. Vapor bubbles leaving the heater rise in the conduit circuit section contacting the member, are released from the surface of the liquid in the reservoir, and are condensed by the continuously operated heat exchanger. This passage of the vapor bubbles, which may be quite turbulent, causes a scrubbing action that removes any vapor bubbles, which may be clinging to the conduit walls in the area where the conduit is in thermal contact with the temperature stable member. Such action provides for primarily a liquid layer adjacent to the inner conduit surface thereby providing good thermal conductivity between the liquid and the temperature stable member.

The system also comprises a fluid flow control means at the output of the heat exchanger, and a return conduit intercoupling an output of the heat exchanger and an input of the heat source. The fluid flow control means is responsive to a change in the temperature of a temperature stable platform to thereby cause cold fluid from the heat exchanger to pass via the return conduit to the heat source. This in turn causes the temperature of the member to decrease. This cyclic operation continues and the temperature of the platform is controllable to within fractions of a centigrade degree.

In accordance with one embodiment of the invention the fluid flow control means comprises a temperature controlled solenoid valve which is responsive to the temperature of the platform, opening when the temperature exceeds a predetermined value thereby providing cold liquid for the heater which in turn lowers the temperature of the fluid in the fluid conduit and member. When a small temperature decrease occurs, the valve closes and the temperature of the temperature stable platform increases.

Unlike the previously discussed prior art systems, in the present system not all of the components are operated at the same temperature as the temperature stable member. The heat exchanger, for example, has a coolant continuously circulated in its cooling coil, and the mean temperature of the heat exchanger is substantially less than the temperature of the member. Thus, in the present system temperature control is not provided by metering the coolant delivered to the heat exchanger; instead it is provided by using a temperature sensitive fluid flow control means intercoupling the output of the heat exchanger and the heater for selectively passing cooled fluid to the heater.

Figure 2:
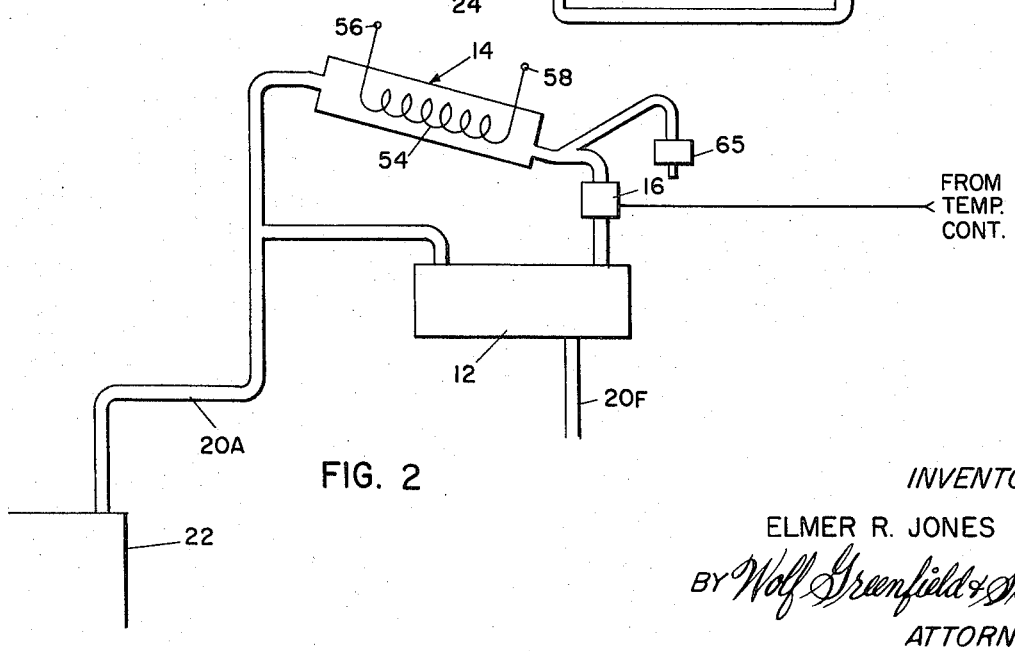

The foregoing and other objects of the invention should now become apparent upon a reading of the following exposition in conjunction with the accompanying drawings in which:

FIG. 1 is a partial cross-sectional and schematic drawing of a temperature control system in accordance with the present invention; and FIG. 2 is a fragmentary view of another embodiment in accordance with the invention showing an alternate arrangement for the reservoir and heat exchanger.

EXPOSITION

Referring now to FIG. 1 there is shown a preferred embodiment of the present invention. The closed-loop system generally comprises a heater 10, a reservoir 12, a heat exchanger 14, and a temperature controlled solenoid valve 16. A continuous single or multi-section conduit circuit 20 intercouples these components that comprise the overall system. The system is operable as hereinafter discussed, to maintain temperature stable platform 22 at a constant predetermined temperature.

Heater 10 may be constructed of 3" tubing, and includes an input port 24 and an output port 25. An elongated heater element 28 extends inside heater 10 and connects to a conventional 110 volt A.C. source.

The continuous multi-section conduit circuit 20 includes a plurality of separate conduit sections. A conduit section 20A couples from the output port 25 of heater 10 to an input port 30 of reservoir 12. The connections of conduit section 20A at ports 25 and 30 are conventional. Temperature stable platform 22 is metallic and includes a semicylindrical channel (not shown) for accommodating a portion of conduit section 20A. Section 20A is firmly held by suitable clamping means (not shown) in thermal contact with platform 22.

Temperature stable platform 22 has a number of electronic devices 32 secured thereto with their respective containers in thermal contact with the platform 22. Each of the devices 32 couples to electronic means (not shown) for dynamically operating each of the devices. A temperature sensitive element 34 also is coupled directly to platform 22 and has a connecting line 36 that ties to a temperature controller 38. The output of the temperature controller couples by line 40 to an enabling input of solenoid valve 16.

The conduit section 20A has a section 20B tapped thereoff which couples to a relief valve 42. If the pressure in the closed loop system exceeds a set predetermined value, the relief valve 42 will open and relieve the pressure within the system. This relief valve 42 may be of conventional design.

Reservoir 12 may be constructed of 3" tubing, and includes, in addition to input port 30, an output port 44. The liquid 50 within the reservoir is shown in FIG. 1 at a level L.

A conduit section 20C couples between output port 44 of reservoir 12 and an input port 48 of heat exchanger 14. The heat exchanger 14 may also be made of a 3" tubing and includes an output port 52. The heat exchanger 14 may typically include a cooling coil 54 disposed inside of exchanger 14. The coil includes an input port 56 and an output port 58 for circulating a coolant within coil 54. A small amount of fluid 50 such as water is shown at the bottom of heat exchanger 14. This fluid has been condensed by the heat exchanger and may be at the level L.

A conduit section 20D couples from the output port 52 of heat exchanger 14 to an input port 60 of solenoid valve 16. A tapped off conduit section 20E extends from section 20D and is coupled to a fill plug 65. This plug may be removed to introduce fluid into the system and may also be used to pull a vacuum on the system when desired.

As previously mentioned, a control line 40 coupled to solenoid valve 16 and when the temperature controller 38 detects a predetermined temperature a signal is sent on line 40 to cause solenoid valve 16 to open. When the temperature controller 38 senses a decrease in the temperature of temperature stable platform 22 the signal on line 40 terminates and the solenoid valve 16 closes. This action allows a metered amount of fluid 50 to pass via conduit section 20F to input port 24 of heater 10. The temperature controller 38, temperature sensitive element 34, and solenoid valve 16 may be of conventional design.

Referring now to the operation of the closed-loop system shown in FIG. 1, it may be assumed that the desired operating temperature of the temperature stable platform 22 and associated electronic devices 32 is 150° C. Initially, the A.C. voltage is applied to the coil 28 of heater 10 and as the liquid 50 is heated vapor bubbles form and pass via conduit section 20A toward reservoir 12. During the initial heating the solenoid valve 16 is closed and thus no cold liquid is introduced via conduit section 20F.

One aspect of this invention is that the heat transfer may occur from the fluid in conduit section 20A to the temperature stable platform 22 or, vice versa. Initially of course, the heat transfer would be from the fluid in section 20A to the temperature stable platform 22 until the platform assumes the correct predetermined temperature. When this temperature is reached, sensing element 34 actuates temperature controller 38 which in turn causes solenoid valve 16 to open.

As the temperature of the platform 22 increases the vapor bubbles passing upwardly in conduit section 20A cause a turbulence that prevents vapor bubbles from remaining on the surface of conduit section 20A adjacent platform 22. These vapor bubbles are released from the surface of the fluid in reservoir 12 and pass via conduit section 20C to heat exchanger 14. Thus, the level L of fluid in reservoir 12 decreases as the temperature increase continues. Moreover, the level L is heat exchanger 14 increases.

A coolant is introduced by way of port 56 to cooling coil 54 of heat exchanger 14. This coolant may be water or another coolant such as Freon. The coolant is continuously circulated and thus any vapors escaping from reservoir 12 are continuously condensed by heat exchanger 14 increasing the fluid level L in exchanger 14. Because solenoid valve 16 is closed previous to attaining the predetermined temperature, this fluid in heat exchanger 14 continues to accumulate.

As previously mentioned when the predetermined temperature is reached the solenoid valve 16 temporarily opens. A small quantity of fluid flows in conduit section 20F to heater 10. This fluid causes a relatively rapid cooling of the fluid 50 in heater 10 and in conduit section 20A. Therefore, after a relatively short time duration sensing element 34 detects a drop in the temperature of temperature stable platform 22 and solenoid valve 16 is in turn closed preventing any further fluid flow from heat exchanger 14 via conduit section 20F. This operation continues in a cyclic fashion with the temperature stable platform 22 increasing in temperature when the solenoid valve 16 is closed, and decreasing in temperature upon an opening of the solenoid valve.

In accordance with this invention the reservoir 12 should have a capacity of fluid greater than the heat exchanger 14. This is necessary so that sufficient fluid is left in section 20A when the predetermined temperature is about to be reached. If enough fluid were not provided in reservoir 12 the fluid would decrease in its level in section 20A and an uneven heating and temperature gradient of temperature stable platform 22 would occur.

In the embodiment shown in the drawing the input port 24 to heater 10 is at the bottom of the heater. For all applications this is not necessary, however, it is advantageous so that bubbles formed in heater 10 do not travel upwardly in conduit section 20F.

One of the important features of this invention is the scrubbing action provided by the vapor bubbles leaving heater 10. This action is similar to that observed in a boiling pan of water wherein rather turbulent bubble movement occurs. Thus, the liquid in conduit section 20A adjacent to the platform 22 does not contain vapor bubbles that are clinging to the inner surface of the conduit section 20A. This provides a good thermal conductivity between section 20A and platform 22. Also, another important feature of this invention is that the portion of the system including the heat exchanger 14 is operated at a reduced temperature from the temperature of platform 22. For example, the platform 22 may be at a temperature of 150° C. whereas heat exchanger 14 which has a coolant continuously pumped therethrough remains at 40° to 50° or essentially room temperature. The heat exchanger 14 therefore functions as a source of cold liquid which is metered periodically, not by metering the coolant passing through coil 54, but instead by metering by means of a solenoid valve or the like located at the output of the heat exchanger.

Another feature of this invention is that due to the lower temperatures of heat exchanger 14 excessive pressures are not needed in forcing the coolant through coil 54. The pressure at an ordinary water tap is usually sufficient to cause the necessary cooling.

With apparatus constructed in accordance with the invention it is possible to operate over a wide temperature range, and particularly at lower temperatures. To provide low temperature operation a vacuum can be pulled on the system at filler plug 65. By operating at lower pressures in the closed-loop system it is possible to provide boiling and turbulence from heater 10 at lower temperatures on the order of 40° to 50°, using water as a fluid.

FIG. 2 shows a fragmentary view of another embodiment of the invention illustrating another arrangement for the reservoir and heat exchanger. This alternate embodiment may be identical to the embodiment of FIG. 1 with the exception of what is shown in FIG. 2. In FIG. 2 the conduit section 20A from heater 10 may extend to the reservoir and also to the heat exchanger. The output port of the heat exchanger couples directly to the solenoid valve, and the output of the solenoid valve couples to a second input of the reservoir. The output port of the reservoir then feeds via conduit section 20F to heater 10. With this type of a system the reservoir remains at substantially the same temperature as the temperature stable platform 22 and the return conduit section remains filled with fluid. The heat exchanger operates the same as discussed with reference to FIG. 1 and is continuously condensing vapors from the conduit section 20A. The solenoid valve opens at the appropriate temperature to introduce sufficient cool fluid to the reservoir to cause, in turn, a decrease in the temperature of the fluid remaining in heater 10. This tends to decrease the temperature of the platform 22 and stabilize the system in a manner similar to that discussed with reference to the FIG. 1.

Having described certain embodiments of this invention, other changes in and variations of these embodiments may be contemplated as falling within the scope of this invention. For example, the heat exchanger could use forced air with some type of a fin arrangement for providing cooling and associated condensing of the liquid. Also, in a particular specific system where the quantity of cold fluid can be ascertained, it is possible to replace the solenoid valve by a restricted orifice. For example, if the devices 32 are being operated with a given dissipation and a solenoid valve is used, it can be determined that a certain amount of fluid periodically introduced is sufficient to stabilize the temperature of platform 22. Therefore, this solenoid valve could be replaced by an orifice of appropriate cross section to continuously provide a cooled fluid to heater 10 to stabilize the system in this manner. In one system constructed according to the invention a plurality of sections 20A were connected in parallel to a plurality of members 22. With this arrangement only one heater, reservoir and heat exchanger may be used. Certain other modifications and changes in this invention will probably also become apparent to one skilled in the art, all of which are contemplated as falling within the scope of this invention and to be limited only by the appended claims.

What is claimed is:

1. A closed-loop system that is partially filled with a fluid and is adapted to maintain a heat transfer member at a substantially constant predetermined temperature comprising:

a heat source positioned at least in part at a lower elevation than the heat transfer member for generating vapor bubbles;

a fluid reservoir and heat exchanger both positioned at least in part at a higher elevation than the heat transfer member a fluid conduit circuit including a plurality of conduit sections intercoupling the heat source, heat exchanger and reservoir, at least one of said sections being in thermal contact with the heat transfer member, and means coupling an output of the heat exchanger to an input of the heat source;

said heat exchanger having an input port coupled via one of said plurality of conduit sections from the reservoir to receive vapor bubbles generated from the heat source;

and a fluid flow control means at an output of the heat exchanger responsive to a change in the temperature of the heat transfer member to cause cooled fluid from the heat exchanger to pass to the heat source to thereby stabilize the temperature of the heat source and maintain the temperature of the member at said predetermined value.

2. A system in accordance with claim 1 wherein the connection of the return conduit section is made at a bottom portion of the heat source.

3. A system in accordance with claim 1 wherein the heat exchange member includes means defining an arcuate channel, and at least a part of the conduit section coupled from the heat source to the reservoir is positioned in said channel.

4. A system in accordance with claim 1 wherein a first conduit section couples from an output of the heat source to an input of the reservoir and has a portion thermally contacting the heat transfer member; and a second conduit section coupling from a top portion of the reservoir to an input of the heat exchanger.

5. A system in accordance with claim 1 wherein said heat exchanger includes a cooling coil having a coolant continuously flowing therethrough during the operation of the system.

6. A system in accordance with claim 1 wherein said fluid flow control means includes a temperature sensitive control circuit coupled to the heat transfer member, and an electrically operated solenoid valve having an input coupled from the temperature sensitive control circuit, said control circuit adapted to change state when the predetermined temperature is reached to in turn open the solenoid valve, said control circuit adapted to thereafter change to a second state thereby closing the solenoid valve.

7. A system in accordance with claim 1 wherein a first conduit section couples from an output of the heat source to an input of the reservoir and input of the heat exchanger and has a portion thermally contacting the heat transfer member.

8. A system in accordance with claim 7 wherein the fluid flow control means couples to a second input of the reservoir and an output of the reservoir couples via the return section to the heat source.

9. A system in accordance with claim 1 wherein the conduit section extending between the heat source and reservoir includes a plurality of parallelly arranged sections each contacting corresponding heat transfer members.

10. A system in accordance with claim 1 wherein the heat exchanger includes a cooling coil and the fluid in the heat exchanger covers the coil to a level that provides for a condensing rate which is optimum for the system at varying heat loads and operating temperatures.

11. A closed-loop system that is partially filled with a fluid and is adapted to maintain a heat transfer member at a substantially constant predetermined temperature comprising:
   a heat source positioned at least in part at a lower elevation than the heat transfer member;
   a fluid reservoir and heat exchanger both positioned at least in part at a higher elevation than the heat transfer member;
   a fluid conduit circuit including a plurality of conduit sections intercoupling the heat source, heat exchanger and reservoir, at least one of said sections being in thermal contact with the heat transfer member, and a return conduit section coupling an output of the reservoir to an input of the heat source;
   said heat exchanger having an input port coupled via one of said plurality of conduit sections from the reservoir to receive vapor bubbles generated from the heat source;
   and a fluid flow control means at an output of the heat exchanger responsive to a change in the temperature of the heat transfer member to cause cooled fluid from the heat exchanger to pass to the reservoir and via the return conduit section to the heat source.

12. In a closed-loop, vacuum sealed, partially fluid-filled heat transfer system having a heat source, a fluid reservoir and a heat exchanger intercoupled by means of a multisection fluid conduit and including a conduit section in thermal contact with a heat transfer member, said system for maintaining the heat transfer member at a substantially constant predetermined temperature, the improvement comprising:
   a fluid flow control means at an output of the heat exchanger responsive to a change in the temperature of the heat transfer member to cause cooled fluid from the heat exchanger to pass to the heat source when the temperature of the member just exceeds the predetermined value.

13. In a closed-loop, vacuum sealed, partially fluid-filled heat transfer system having a heat source, a fluid reservoir and a heat exchanger intercoupled by means of a multisection fluid conduit and including a conduit section in thermal contact with a heat transfer member, said system for maintaining the heat transfer member at substantially constant predetermined temperature, the improvement comprising:
   a fluid flow control means at the output of the heat exchanger including means defining a restricted orifice of predetermined size to continuously permit a predetermined amount of cooled fluid from the heat exchanger to pass via a conduit section to the heat source;
   and wherein said heat exchanger includes cooling means that is continuously operable.

14. A system in accordance with claim 1 wherein said reservoir has a large enough fluid capacity so that fluid remains in the entire conduit section contacting the heat transfer member even when the member has attained its predetermined temperature.

15. A system in accordance with claim 1 wherein said vapor bubbles pass via the conduit section contacting the heat transfer member causing a scrubbing action therealong so as to provide primarily a liquid layer adjacent the surface of the conduit contacting the member.

16. A system in accordance with claim 12 wherein said heat exchanger is continuously operated whereas said fluid flow control means is cyclically operated.

References Cited
UNITED STATES PATENTS 2,484,542   10/1949   Atwood   165—80

CHARLES SUKALO, Primary Examiner

U.S. Cl. X.R.

165—80, 105